(12) United States Patent
Sasajima

(10) Patent No.: US 7,311,299 B2
(45) Date of Patent: Dec. 25, 2007

(54) AERATION DEVICE AND AERATION SYSTEM

(75) Inventor: Kunihiko Sasajima, Tokyo (JP)

(73) Assignee: Daicen Membrane-Systems, Ltd., Sakai-shi, Osaka (JP)

( * ) Notice: Subject to any disclaimer, the term of this patent is extended or adjusted under 35 U.S.C. 154(b) by 0 days.

(21) Appl. No.: 11/258,373

(22) Filed: Oct. 25, 2005

(65) Prior Publication Data

US 2007/0013089 A1    Jan. 18, 2007

(30) Foreign Application Priority Data

Oct. 26, 2004  (JP)  .............................. 2004-310592
Jul. 8, 2005   (JP)  .............................. 2005-200256

(51) Int. Cl.
*B01F 3/04*    (2006.01)

(52) U.S. Cl. ........................... 261/122.1; 261/DIG. 70

(58) Field of Classification Search ............ 261/122.1, 261/122.2, DIG. 70
See application file for complete search history.

(56) References Cited

U.S. PATENT DOCUMENTS

| | | | | |
|---|---|---|---|---|
| 4,960,546 A | * | 10/1990 | Tharp | 261/122.1 |
| 5,015,421 A | * | 5/1991 | Messner | 261/122.1 |
| 5,330,688 A | * | 7/1994 | Downs | 261/122.2 |
| 5,676,890 A | * | 10/1997 | Ott | 261/122.2 |
| 5,693,265 A | | 12/1997 | Jager et al. | |
| 5,762,835 A | | 6/1998 | Bassfeld | |
| 5,858,283 A | * | 1/1999 | Burris | 261/122.1 |
| 6,345,812 B1 | | 2/2002 | Jager et al. | |
| 6,464,211 B1 | * | 10/2002 | Downs | 261/122.1 |
| 6,811,148 B2 | | 11/2004 | Frankel et al. | |
| 2002/0140116 A1 | * | 10/2002 | Tharp | 261/122.1 |
| 2002/0149123 A1 | * | 10/2002 | Edel et al. | 261/122.1 |
| 2004/0124550 A1 | * | 7/2004 | Casper et al. | 261/122.1 |

FOREIGN PATENT DOCUMENTS

| | | |
|---|---|---|
| JP | 06-071288 | 3/1994 |
| JP | 2003-1290 | 1/2003 |
| JP | 2003-24974 | 1/2003 |

OTHER PUBLICATIONS

Design Manual, Fine Pore Aeration Systems, Chapter 2, Fine Pore Diffuser Characteristics, EPA/625/1-89/023, Sep. 1989, pp. 3-36.

* cited by examiner

*Primary Examiner*—Scott Bushey
(74) *Attorney, Agent, or Firm*—Flynn, Thiel, Boutell & Tanis, P.C.

(57) ABSTRACT

The present invention provides an aeration device made up of a rectangular elastic porous body, a support base supporting the elastic porous body from below and having an orifice for pressurized air, and a securing component which secures the elastic porous body to the support base integrally, wherein the support base contains a supporting portion supporting the elastic porous body from below and an attaching portion connected to the supporting portion and attaching the supporting portion to a pressurized air distribution pipe, the rectangular elastic porous body having a box shape having an opening portion, and the supporting portion being disposed in an elastic porous body. In addition, the present invention provides an aeration system made up of two or more of the above described aeration devices installed on a pressurized air distribution pipe, wherein each aeration device is disposed contacting mutually with no space between them.

5 Claims, 7 Drawing Sheets

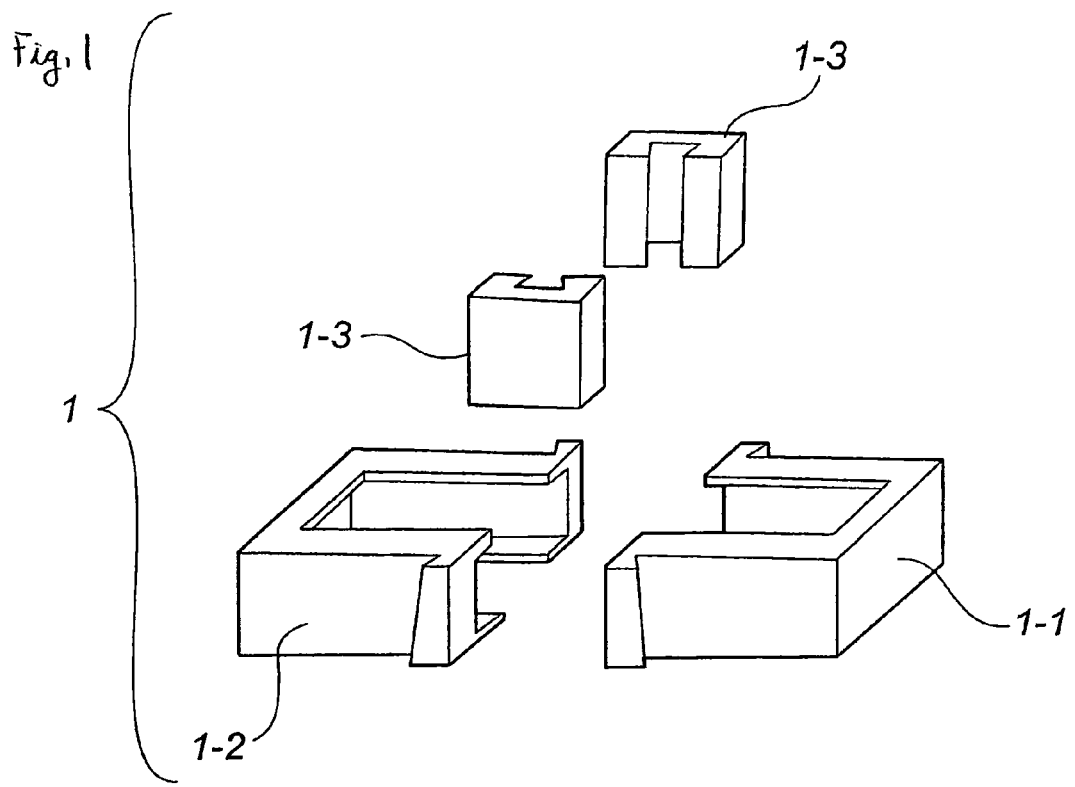
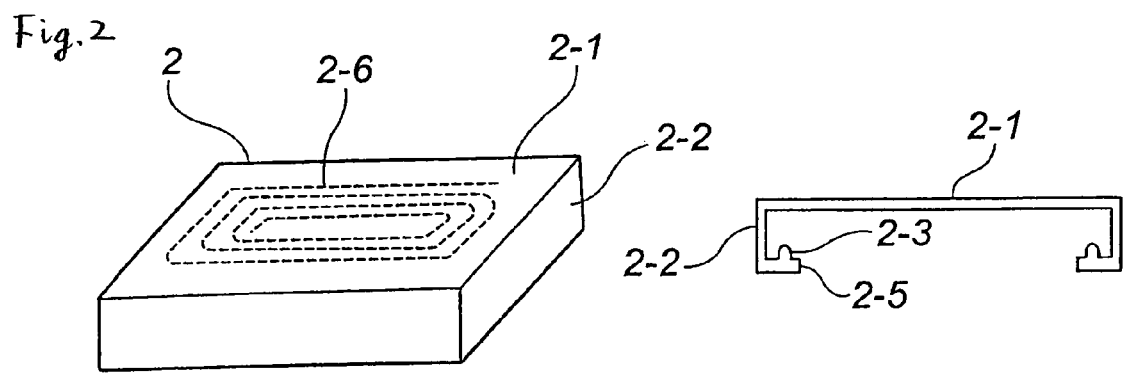

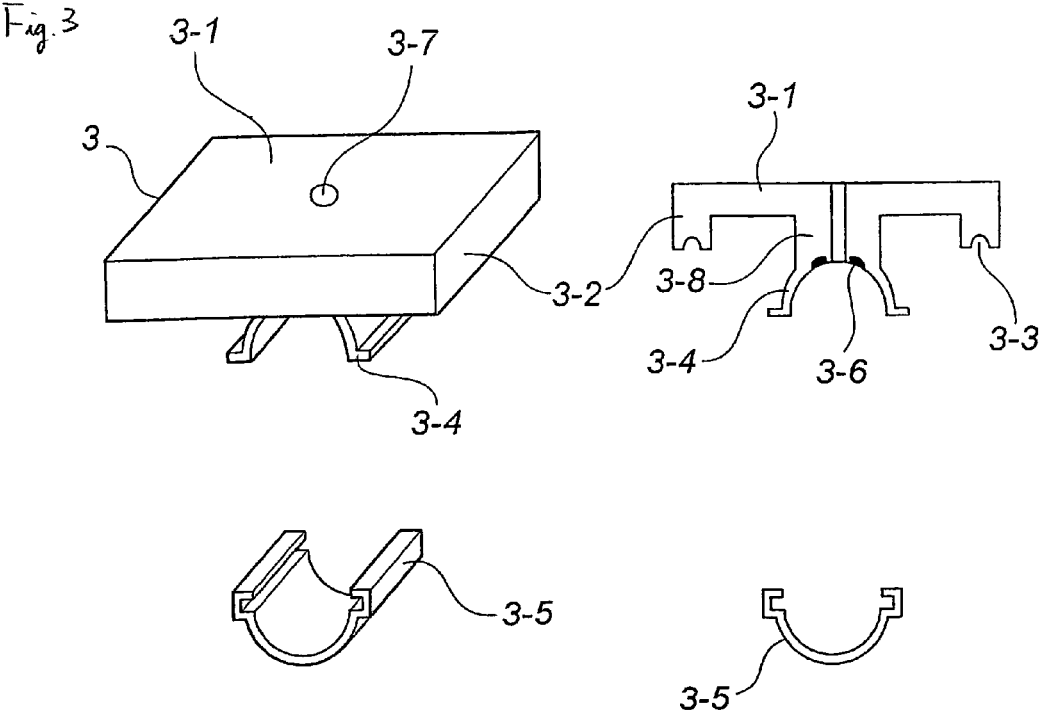
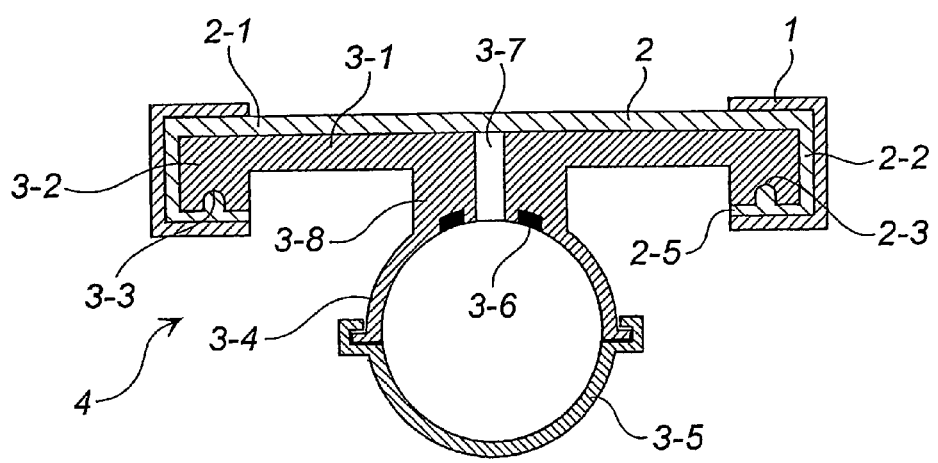

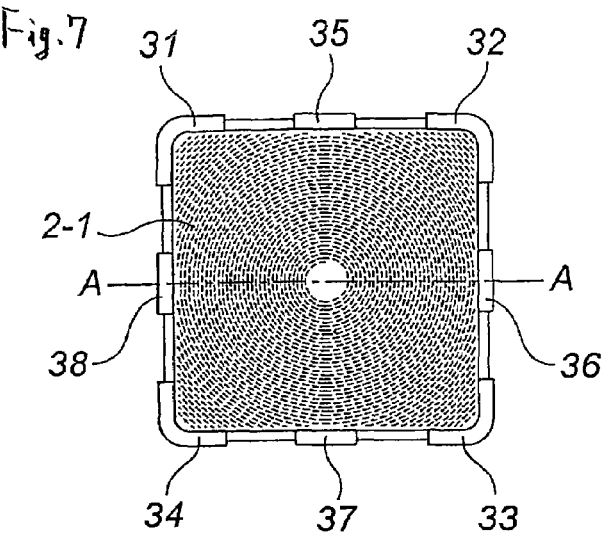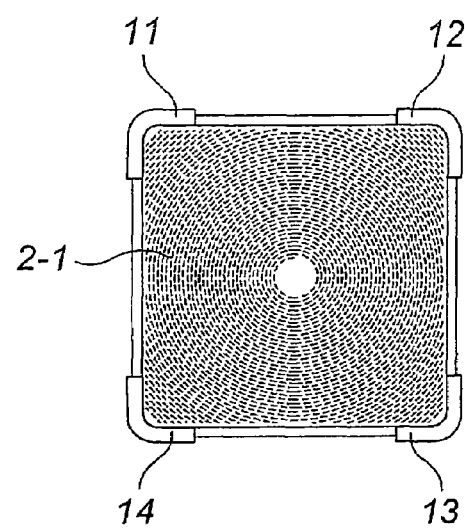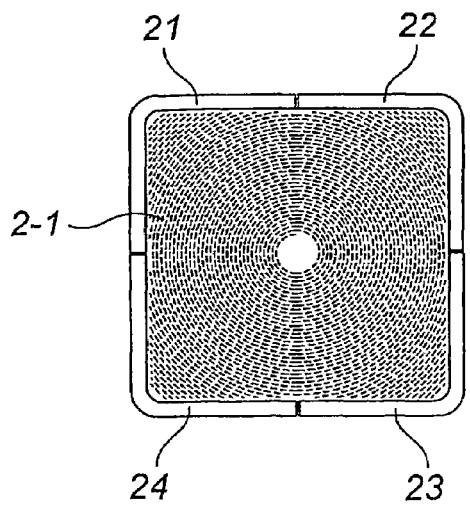

(a)  (b)

(a)

(b)

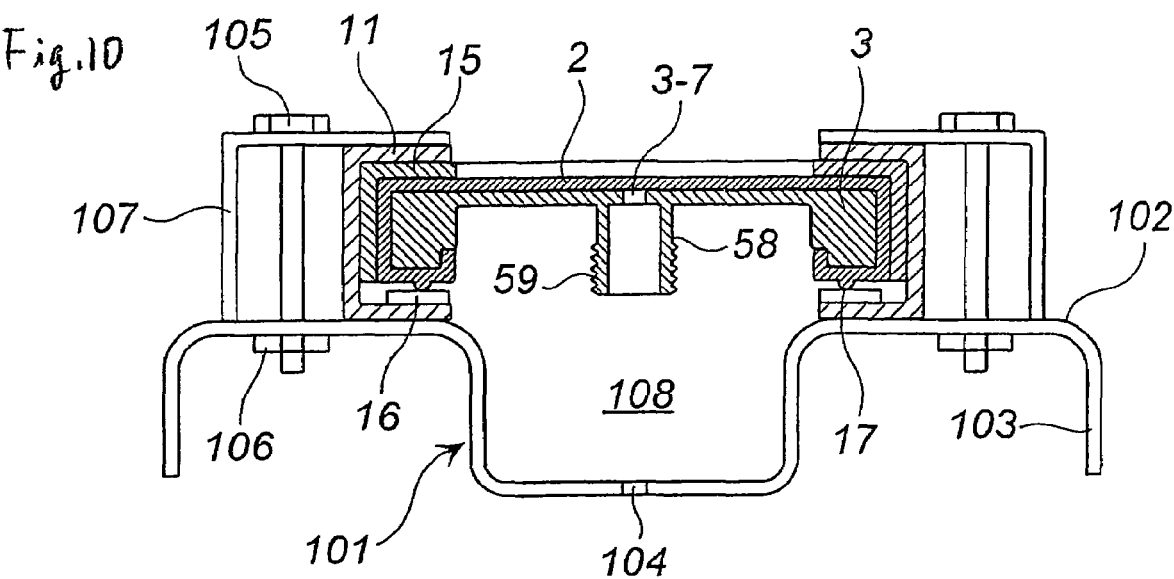

AERATION DEVICE AND AERATION SYSTEM

CROSS-REFERENCE TO RELATED APPLICATIONS

This application claims priority to Japanese patent application No. 2004-310592, filed on Oct. 16, 2004 and Japanese patent application No. 2005-20056, filed on Jul. 8, 2005. The contents of the two Japanese patent applications are incorporated by reference herein.

FIELD OF THE INVENTION

The present invention relates to an aeration device installed in an aeration basin used for organic waste water treatment system, especially municipal waste water treatment, and an aeration system utilizing it.

BACKGROUND OF THE INVENTION

Currently plate diffusers are installed in aeration devices installed in aeration basins of a lot of municipal waste water treatment plants.

A ceramic plate diffuser was employed conventionally. However, a plastic plate diffuser subsequently has been manufactured, which is light, has good workability, can change bubble size easily, is manufactured easily, and is cheap. It has the same size as a ceramic plate diffuser and is easy to replace a ceramic one with a plastic one. A plastic plate diffuser can easily replace a ceramic plate diffuser, using a holder for a ceramic plate diffuser as it is.

Furthermore, a membrane diffuser of an ultrafine bubble type has been used due to its high efficiency on behalf of the plate diffusers and tube diffusers made of a porous polymer.

SUMMARY OF THE INVENTION

However, a membrane diffuser suggested until now has been a disc type or a tube type. So an effective bubbling area per installation area has not been able to be increased. A rectangle-shaped membrane diffuser is known, but its attaching structure to a pipe is complex.

The present invention provides an aeration device which can increase an effective bubbling area per installation area and an aeration system using the aeration device.

The present invention provides an aeration device comprising a rectangular elastic porous body, a support base supporting the elastic porous body from below and including an orifice for pressurized air, and a securing component which secures the elastic porous body to the support base integrally, wherein the support base comprises a supporting portion for supporting the elastic porous body from below and an attaching portion connected to the supporting portion and attaching the supporting portion to a pressurized air distribution pipe, the rectangular elastic porous body having a box shape including an opening portion, and the supporting portion is disposed in an elastic porous body (or a box).

DETAILED DESCRIPTION OF THE INVENTION

The rectangular elastic porous body of the present invention is an elastic body obtained by molding an elastic material and including a lot of fine perforations. Its shape in plan view is rectangular such as a square, a rectangle, or a lozenge, and its shape in whole view is a box shape including an opening portion. When aeration is not done, that is, when pressurized air from a pressurized air distribution pipe is not fed to below an elastic porous body, an upper plane portion of the elastic porous body preferably has enough thickness. Even if it does not have, strength and shape of the elastic body can be held by disposing the support base.

An orifice to lead pressurized air fed from a pressurized air distribution pipe to under the surface of the elastic porous body penetrates this support base. This orifice is preferably located under the approximate center of the elastic porous body in the aeration device. When pressurized, the pressurized air passes the orifice, expands the elastic porous body upward and fine pores open to produce fine air bubbles.

This support base comprises a supporting portion supporting the elastic porous body from below and an attaching portion connected to the supporting portion and attaching the supporting portion to a pressurized air distribution pipe.

Here, the supporting portion is disposed under the rectangular elastic porous body and supports the porous body and its shape, especially its shape in plan view, is preferably the same as that of the elastic porous body. The supporting portion is disposed in the elastic porous body.

The attaching portion is disposed under and connected to the supporting portion. It attaches the elastic porous body to the pressurized air distribution pipe. This attaching system is not limited and publicly known methods can be used.

In addition, in the present invention, a securing component is used in order to secure the elastic porous body to the support base integrally. This securing component secures the elastic porous body and the support base disposed under that, and seals a border between the elastic porous body and the support base. For example, this securing component can have a shape covering the peripheral edges of the rectangular elastic porous body and the rectangular support base, and can adhere to the circumference of the peripheral edges for securing.

The second invention provides the aeration device, wherein the rectangular elastic porous body includes an inward flange portion at a peripheral edge portion of the opening portion of the box, and the porous body wraps the supporting portion.

Not only the supporting portion of the support base is disposed in the box, but also the porous body has a flange portion. So the elastic porous body can wrap the supporting portion, to improve adhesion and airtightness between the supporting portion and the elastic porous body.

The third invention provides the aeration device, wherein the attaching portion comprises an upper half cylinder portion and a lower half cylinder portion, and the attaching portion has a shape which closely contacts and surrounds from outside the pressurized air distribution pipe at a position at which the aeration device is installed in a state that the upper half cylinder portion and the lower half cylinder portion are matched.

In this invention, the attaching portion comprises an upper half cylinder portion and a lower half cylinder portion. The upper half cylinder portion is preferably connected to the supporting portion integrally. As a connecting method, the supporting portion and the upper half cylinder portion can be molded as one body. Or, screws formed in the supporting portion and the upper half cylinder portion that are molded separately can be fit for connection.

It is preferable that the upper half cylinder portion and the lower half cylinder portion respectively have a shape comprising a part of a cylindrical shape, and that they form a cylindrical shape when they are put together and connected at each other's edge. A connection method of both ends of the upper half cylinder portion and the lower half cylinder portion is not limited and publicly known methods can be used.

Furthermore, a cylinder portion formed when these upper and lower half cylinder portions are connected closely contacts and surrounds a pressurized air distribution pipe from outside at position where an air distribution hole from the pipe is disposed, such that an orifice disposed in the support base and the air distribution hole communicate.

The fourth invention provides the aeration device which further comprises a leg portion between the attaching portion and the supporting portion, the leg portion being connected integrally with the attaching portion and the supporting portion.

The leg portion is, for example, a lengthwise cylindrical component, and preferably includes an orifice inside at a position at which the orifice communicates with the air distribution hole of the pipe and the orifice in the support base. Due to the leg portion, the distance between the pipe and fine bubble discharging position can be adjusted, and installation of the aeration device according to the shape of the installation site.

The fifth invention provides the aeration device, wherein the leg portion is connected to the upper half cylinder portion by a screw structure made in the edge of the leg portion and the edge of the upper half cylinder portion.

In the above aeration device, the elastic porous body is obtained by molding elastic materials into a desired shape. Materials of the porous body, for example, can be a rubber selected from the group consisting of ethylene propylene rubber (EPDM), silicone rubber, polyurethane, chloroprene rubber, nitrile rubber, fluorine-containing rubber (for example, Viton (registered trademark), PTFE), and perfluoro elastomer. Ethylene propylene rubber in particular is desirable due to its high membrane strength and superior heat and water resistance. In addition, fluorine-containing rubber and perfluoro elastomer are preferable from the point of chemical resistance.

The thickness of the plane containing the perforations in the elastic porous body is preferably 0.1 to 3.0 mm, and the porous body preferably includes 10000 to 1000000 fine perforations per square meter. These are fine perforations penetrating through the upper plane portion, and perforations for discharging the fine bubbles for aeration. The thickness of the plane, including the perforations, is preferably 0.1 to 3.0 mm, and more preferably 0.4 to 2.0 mm.

Less thickness than this range is unfavorable since the membrane strength is not kept, and more thickness than this range is unfavorable since the pressure drop during aeration becomes large. The number of perforations is preferably 10000 to 1000000 per square meter, and more preferably 100000 to 1000000. More perforations than this range may cause less membrane strength and the discharged bubbles may coalesce with each other to become larger sized. Less perforations than this range is not preferable since the number of bubbles decrease and the primary object is not achieved.

Furthermore, the thickness of the plane including the perforations is preferably controlled such that the thickness is larger at the center of the rectangular shape and becomes gradually less from the center to the circumference. The elastic porous body is pressurized from below, often through an orifice disposed under the center of a plane including the perforations. So, the nearer to the center the perforation is, the bigger pressure the perforations receive, to open more widely. If the thickness is the same all over the entire plane, the nearer to the center the vent is, the bigger the perforation is, so that bigger air bubbles are discharged from the center and only a small amount of small bubbles are discharged near periphery. So fine bubbles can't be produced effectively, so that the effective bubbling area and oxygen transfer efficiency in the aeration basin is decreased.

Since the thickness in the center is larger, and the nearer to periphery, the smaller the thickness is, the pressure difference between the center portion and the portion near the periphery can be eliminated and, as a result, bubbles of uniform size can be discharged at an equal ratio over the entire plane. Such a thickness control as above, for example, can be achieved by managing the die dimensions precisely in a compression molding method.

The materials of the support base is preferably one or more selected from a group consisting of steel plate, stainless plate, an engineering plastic such as FRP and ABS and a plastic such as PP and polyvinyl chloride.

The material of the securing component is preferably steel plate, stainless plate, or an engineering plastic such as polysulfone and FRP, so that a force pressing down the circumferential portion of the elastic porous body from above is added uniformly on an entire contact surface between the elastic porous body and a securing component. Optionally, the securing component and the elastic porous body can be secured by an adhesive.

The sixth invention provides an aeration system comprising two or more of the above described aeration devices installed on the pressurized air distribution pipe, wherein each aeration device is disposed contacting mutually with no space between them.

When the above two or more aeration devices are installed on a pressurized air distribution pipe, the position of a pressurized air distribution hole, size of the elastic porous body, and so on can be adjusted. For example, all the sizes of the elastic porous bodies of the disposed two or more aeration devices can be same. As a result, two or more aeration devices can be installed on a pipe and disposed contacting mutually with no space between them.

A plurality of elastic porous bodies can be disposed to make a shape in accordance with the shape of an aeration basin, especially a shape in planar view. Such a configuration can increase the effective bubbling area per installation area.

Conventionally, when a disc type aeration device is connected to a pipe, a screw made in the leg portion was generally fitted to a screw made in the pipe. So, each aeration device was necessarily and troublesomely turned to be installed. In the present invention, the aeration device itself doesn't need to be turned during installation to a pressurized air distribution pipe as with a conventional disc type aeration device. The upper and lower half cylinder portions need only to closely contact and surrounds the pipe from outside for installation and work becomes easy.

Preferred embodiments of the aeration device in the present invention are described below.

An elastic porous body of a preferred embodiment comprises an upper plane portion, a wall portion and a lower plane portion. Shape in plan view of the upper plane portion is preferably a square or a rectangle, and a shape in whole view is a cube or a rectangular solid.

The upper plane portion forms the upper plane of the elastic porous body. The wall portion longitudinally connects to the upper plane portion at its edge, that is, its all peripheral edge. The lower plane portion connects to the wall portion in an inward flange shape at entire length of lower edge portion of the wall portion, to form a lower plane of the elastic porous body. These upper plane portion, wall portion and lower plane portion can be molded separately and integrated afterward. Or, the elastic porous body can be molded in one step. It is preferable that angles between the upper plane portion and the wall portion, and between the wall portion and the lower plane portion are 90 degrees, that the upper plane portion is parallel to the lower plane portion, and that shape of the elastic porous body is a rectangular solid. Here, the supporting portion can be disposed in a box (, that is, box shape) comprising the upper plane portion and the wall portion, and including an opening portion.

The lower plane portion is preferably vertically below the upper plane portion. Being vertically below means that a part or all of the lower plane portion overlaps the upper plane portion in plan view of the elastic porous body.

In a preferred embodiment, the supporting portion supporting the elastic body is disposed in a space formed by the upper plane portion, the wall portion and the lower plane portion of the elastic porous body.

For more effective support, the supporting portion preferably has size and a shape enough to almost fill up a space formed by the upper plane portion, the wall portion and the lower plane portion of the elastic porous body for aeration when it is disposed in the space. For example, box shaped one is used which comprises an upper plane portion and a vertical wall portion connecting to the upper plane portion at its edge, preferably all peripheral edge, wherein shape in plan view of the box one is a square or a rectangle.

The lower plane portion of the porous body can wrap a lower surface of the wall portion of the supporting portion in the support base in a flange shape.

Furthermore, in a preferred embodiment, a protruding portion is formed on the lower plane portion of the porous body, and a groove portion fitting the protruding portion is formed on a surface facing to the protruding portion. Forming a protruding portion and a groove portion fitting thereto, and fitting them can increase the coherence degree between the elastic porous body and the supporting portion.

The protruding portion is preferably formed on an upper surface of the lower plane portion. There, the lower surface of the wall portion of the supporting portion faces the upper surface of the lower plane portion, and the protruding portion formed on an upper surface of the lower plane portion fits the groove portion formed on the lower surface of the wall portion of the supporting portion. The cross-section of these protruding portion and groove portion are preferably U-shaped. The protruding portion and groove portion are preferably formed on the entire, optionally partial, length of a lower surface of the wall portion in the supporting portion.

A preferred embodiment further comprises a securing component pressing circumference of the elastic porous body from outside. This securing component is a pressing component for pressing down the elastic porous body, and preventing horizontal expansion. It preferably presses circumference from horizontal outside, especially the wall portion of the elastic porous body from outside. The securing components are attached at the circumference of the elastic porous body continuously or discontinuously. Continuous attaching is preferred for uniform pressing.

In a preferred embodiment, for more effective securing, the securing component comprises an upper plane portion, a wall portion and a lower plane portion. It preferably has a shape such that the upper plane portion presses an upper plane portion of the elastic porous body from above, the wall portion presses the wall portion of the elastic porous body from the side, and the lower plane portion presses the lower plane portion of the elastic porous body from below.

The securing component preferably comprises an upper plane portion, a vertical wall portion connecting to the upper plane portion at its edge, preferably its entire peripheral edge, and a lower plane portion connecting to the wall portion at its lower peripheral edge. Also, the upper and lower plane portions preferably have an O-shape having a central aperture, and have a cross-section of horseshoe shape. A reason is that, especially when there are fine perforations for aeration in the upper plane portion of the elastic porous body, it is preferable that there are no securing frames above the perforations. A shape in whole view is preferably a box type and a shape in plan view is a square or a rectangle.

In a further preferred embodiment, the support base comprises a supporting portion, a leg portion connected to the center of a lower part of the supporting portion, an upper half cylinder portion connected to a lower part of the leg portion by a screw, and a lower half cylinder portion connected to the upper half cylinder portion by a wedge structure. An orifice is formed in the respective center of the supporting portion, the leg portion and the upper half cylinder portion. The orifices communicate with an air distribution hole disposed in a pressurized air distribution pipe.

The aeration device is attached to the circumference of the pipe, by putting the aeration device on the pipe such that the orifice of the upper half cylinder portion matches the hole in the pipe, and connecting the lower half cylinder portion put under the pipe and the upper half cylinder portion using the wedge structure.

In aeration, the elastic porous body is pressurized from below by pressurized air distributed through a pressurized air distribution pipe. The air becomes fine bubbles when passing through the fine perforations for aeration.

The aeration device of above structure can increase an effective bubbling area per installation area, and an aeration device which can be easily attached to a pressurized air distribution pipe and an aeration system utilizing it are obtained.

BRIEF DESCRIPTION OF THE DRAWINGS

FIG. 1 is a perspective view showing an example of a securing component of the present invention;

FIG. 2 is a perspective view and a cross section showing an example of an elastic porous body of the present invention;

FIG. 3 is a perspective view and a cross section showing an example of a support base of the present invention;

FIG. 4 is a cross section showing an example of an aeration device of the present invention;

FIG. 7 (*a*) to (*c*) are plan view of an aeration device of the present invention;

FIG. 10 is a cross section showing an example of an aeration device of the present invention.

EXAMPLE

The present invention is specifically explained according to the drawings, but are not limited to the examples below.

Figure 5:
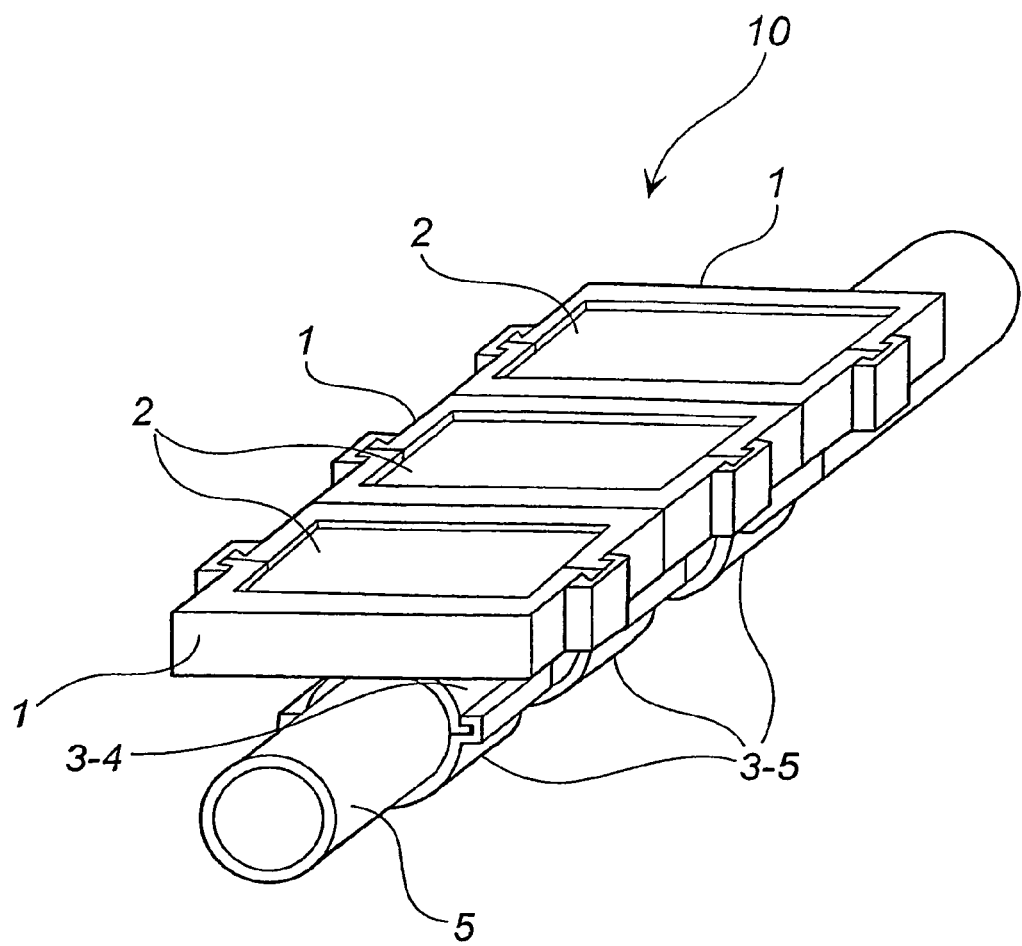
FIG. 5 is a perspective view showing an example of an aeration system of the present invention.

FIG. 1 is a perspective view showing an example of a securing component of the present invention. FIG. 2 is a perspective view and a cross section showing an example of an elastic porous body of the present invention. FIG. 3 is a perspective view and a cross section showing an example of a support base of the present invention. FIG. 4 is a cross section showing an example of an aeration device of the present invention. FIG. 5 is a perspective view showing an example of an aeration system of the present invention.

In FIG. 2, an elastic porous body 2 comprises an upper plane 2-1, a wall 2-2 and a lower plane 2-5. A box including an opening is formed by the upper plane and the wall. The wall 2-2 is connected to the upper plane 2-1 at its peripheral edges, and the lower plane 2-5 is connected to the wall 2-2 at its entire length of lower edge (, that is, its peripheral edge) in a flange shape. The shape of the upper plane is a rectangle, and its thickness is 2 mm. 16,000 fine perforations are formed spirally in the upper plane 2-1. Here, the area of the upper plane 2-1 is 0.09 square meters, and number of perforations per one square meter is 180,000.

In addition, a protrusion 2-3 having a U-shaped cross-section is formed integrally on an upper surface of the lower plane 2-5 at its entire length. This elastic porous body 2 comprises EPDM and is molded by a compression molding method.

In FIG. 3, a support base 3 made of an ABS resin comprises a plane 3-1 and a wall 3-2, and the wall 3-2 is connected to the plane 3-1 at its peripheral edge. The shape of the plane 3-1 is a rectangle, and it has an orifice 3-7 in its center. A groove 3-3 of U-shaped cross-section is formed on a lower surface of the wall 3-2 at its entire length. In addition, the size and shape of this support base are the same as those of the interior space of the elastic porous body shown in FIG. 2, which is formed by the upper plane 2-1, the wall 2-2 and the lower plane 2-5. When the support base 3 is fitted in the space, a supporting component comprising the plane 3-1 and the wall 3-2 is disposed in a box comprising the upper plane 2-1 and the wall 2-2 and including an opening. An upper surface of the plane 3-1 contacts a lower surface of the upper plane 2-1, an outer surface of the wall 3-2 contacts an inner surface of the wall 2-2, and a lower surface of the wall 3-2 contacts an upper surface of the lower plane 2-5.

Furthermore, the protrusion 2-3 fits the groove 3-3 and the elastic porous body 2 closely contacts and is integrated with the support base 3. The elastic porous body 2 wraps around the supporting component.

Furthermore, the support base 3 comprises a leg 3-8 formed integrally with the plane 3-1 on a center of a lower surface of the plane 3-1, and an upper half cylinder 3-4 formed integrally with the leg 3-8 under it. The leg 3-8 has a longitudinal cylindrical shape. The plane 3-1 and the leg 3-8 include an orifice 3-7 longitudinally penetrating their center. This orifice supplies pressurized air from an air distribution hole disposed in a pressurized air distribution pipe (not shown) to a lower surface of the upper plane 2-1 of the elastic porous body 2. Furthermore, a lower half cylinder 3-5 is disposed under the upper half cylinder 3-4. An attaching component comprises 3-4 and 3-5. They are integrated around the pressurized air distribution pipe by fitting a wedge disposed at edge of 3-5 onto a flange disposed at edge of 3-4. 3-6 is an O-ring.

In FIG. 1, the securing component 1 comprises two frames 1-1 and 1-2, and two wedge type clasps 1-3. The frames 1-1 and 1-2 are components having a horseshoe-shaped cross-section, which comprise an upper plane, a wall and a lower plane. In an aeration device, the supporting component of the support base 3 is fitted into an interior space of the elastic porous body 2, and then 1-1 and 1-2 are matched around the elastic porous body 2 in an direction shown in the figure. For integration of 1-1 with 1-2, two wedge type clasps 1-3 are fitted onto flanges formed at edges of 1-1 and 1-2, and the securing component is secured to the circumference of the elastic porous body.

FIG. 4 shows an aeration device 4 comprising the elastic porous body 2, the support base 3 and the securing component 1 of the present invention. The aeration device 4 can be installed on a pressurized air distribution pipe 5 as shown in FIG. 5 to make an aeration system 10. In the aeration device 4, the support base 3 comprises a removable upper half cylinder 3-4 and lower half cylinder 3-5. So, the aeration device can be installed on the pipe easily by an upper half cylinder 3-4 and lower half cylinder 3-5.

FIG. 5 shows an example of an aeration system comprising two or more aeration devices 4 which comprises the elastic porous body 2, the support base 3 and the securing component 1, and is installed on the pressurized air distribution pipe 5, wherein the aeration devices are disposed mutually contacting with no space between them. The effective bubbling area of fine bubbles can be increased in this system, because one side of the securing component 1 of each aeration device is disposed contacting that of a neighboring aeration device with no space between.

Next, embodiments of aeration devices different from those of FIG. 1 to FIG. 5 are described according to FIG. 6 to FIG. 10.

Figure 6:
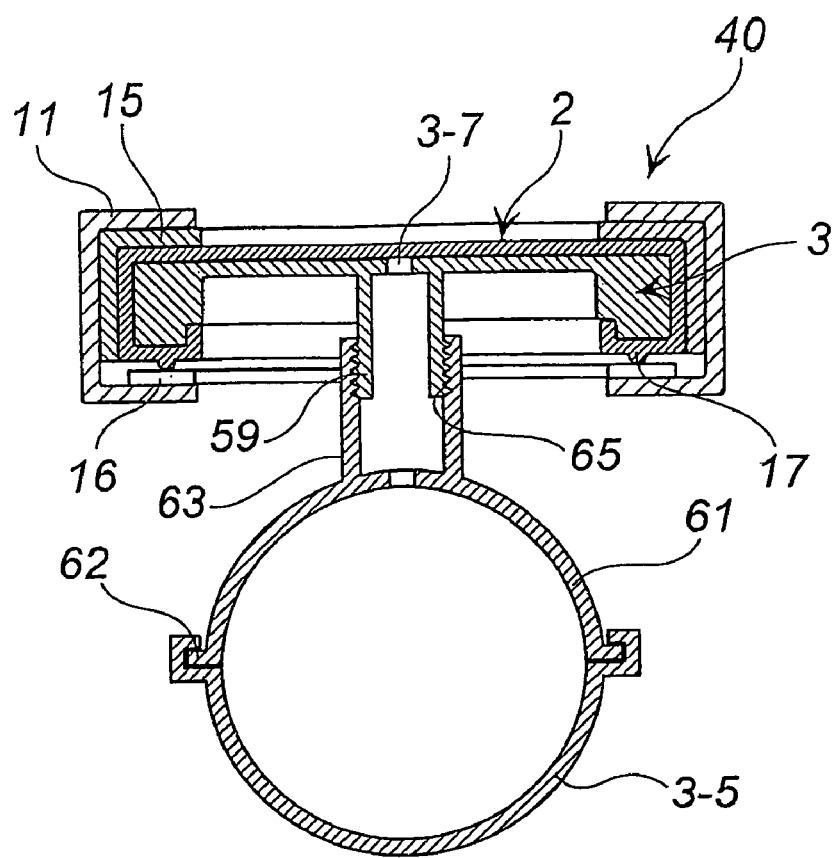
FIG. 6 is a cross section showing an example of an aeration device of the present invention.
Figure 8:
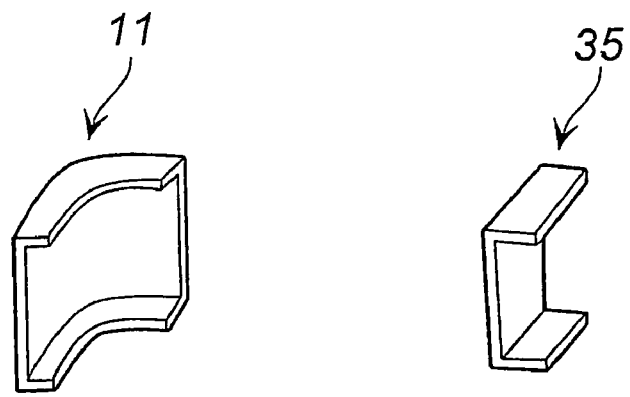
FIGS. 8 (*a*) and (*b*) are perspective view of a securing component for securing an elastic porous body.
Figure 9:
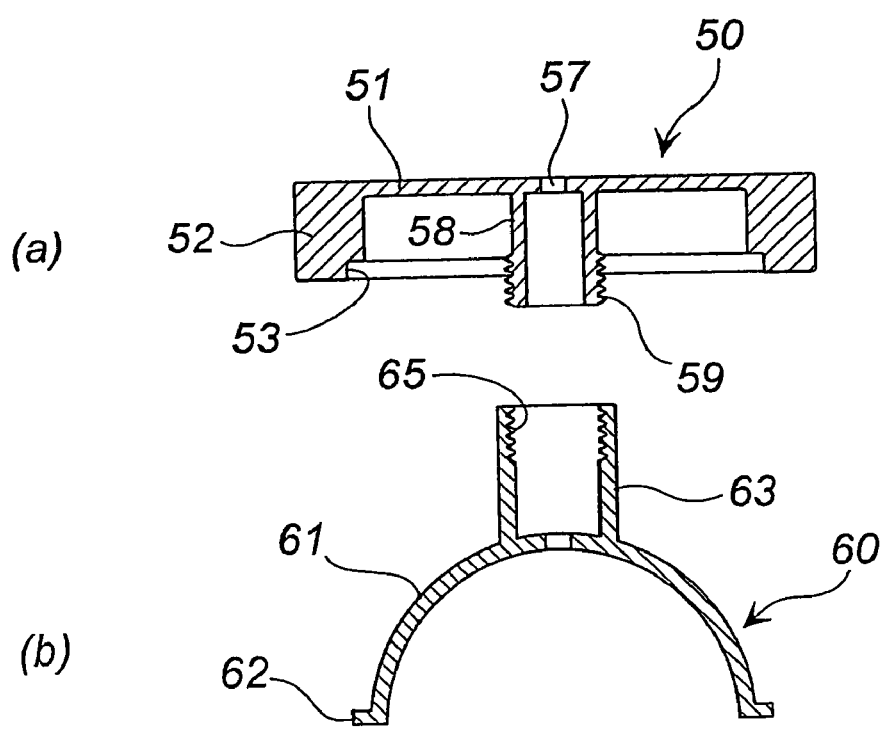
FIG. 9 is a cross section showing an example of a support base of the present invention.

An aeration device of the present invention is explained according to FIG. 6. FIG. 6 is a longitudinal cross section of an aeration device 40. In an aeration device 40, an elastic porous body 2, a support base 3 and a securing component are integrally combined, similarly to the aeration device 4 shown in FIG. 4. However, a first securing component 15 which has a picture frame-shaped plan view and a second securing component 11 shown in FIG. 8 (a) are combined to make a securing component. The support base 3 has a screw portion 59 on a circumference surface of a leg portion 58 as shown in FIG. 9 (a).

The elastic porous body 2 has a box shape which fits an external form of the support base 3 and includes a circular protrusion 17 in the neighborhood of its edge. A plastic circular plate 16 is disposed between the circular protrusion 17 and the second securing component 11. When the second securing component 11 presses from above and below, the circular protrusion 17 is compressed to closely contact the circular plate 16, and further the circular plate 16 closely contacts an inside of the lower plate of the second securing component 11, for an airtight state.

As for the aeration device 40, the second support base 60 as shown in FIG. 9(b) and the lower half cylinder 3-5 as shown in FIG. 4 are combined, to make an aeration device 4 of similar appearance to that of the aeration device shown in FIG. 4.

FIG. 7(a) is a plan view of the aeration device 40 of FIG. 6. FIG. 6 is a cross-section of an aeration device in FIG. 7(a) at A-A line.

The securing component 1 shown in FIG. 1 uses two frames 1-1 and 1-2 and two clasps 1-3, and as shown in FIG. 5 surrounds and secures the circumference of the elastic porous body 2. However, in a securing method shown in FIG. 7, the first securing component 15 is fitted at all peripheral edges of the elastic porous body 2, and the second securing component 11 secures not all of the circumference of the first securing component 15 but a part containing four corners.

In FIG. 7(a), securing components 31 to 34 secure four corners and securing components 35 to 38, as shown in FIG. 8(b), secure each remaining side. The structure of the securing components 31 to 34 is the same as that shown in FIG. 7(b).

In FIG. 7(b), securing components 11 to 14 secure four corners. Securing components 11 to 14 as shown in FIG. 8(a) have an L-shaped planar shape, and front or side shapes in two directions is a rectangle. The securing components 11 to 14 are fitted to and secured at corner portions of an assembly comprising the support base 3, the elastic porous body 2, the first securing component 15 and the circular plane 16.

In FIG. 7(c), securing components 21 to 24 secure at four corners. Securing components 21 to 24 have the same structure as that shown in FIG. 7(b), and can secure at a wider range containing the corner portions.

It is preferable that the material and size of the securing components in FIG. 7(a) to (c) are adjusted so that they can press the circumference when fitted. For example, the material of a securing component can be a metal, such as a stainless steel, or a rigid plastic, and the outer size of an assembly comprising the support base 3, the elastic porous body 2, the first securing component 15 and the circular plane 16 can be similar to the inner size of the securing component. By doing so, when the securing components 31 to 34 shown in FIG. 8(a) are fitted to corner portions of the elastic porous body 2 as FIG. 7(a), securing components press the upper and lower surfaces and two sides perpendicular to each other of the corner portions, and the corner portion is supported by the securing components.

A support base is explained according to FIG. 9, which is an assembly of two divided parts. FIG. 9(a) is a longitudinal cross-section of one of divided support base, and FIG. 9(b) is a longitudinal cross-section of another. It corresponds to a divided support base 3 shown in FIG. 3 into two parts that can be assembled.

The first support base 50 comprises a plane 51 having a planar shape corresponding to an elastic porous body, a wall 52, a groove 53, an orifice 57 and a leg 58. The leg has a screw 59 (a male screw or a female screw) on a lower part of a circumference surface.

A second support base 60 comprises an upper half cylinder 61, a flange 62 of the half cylinder and a pipe 63. A screw 65 is disposed on internal circumference surface of the pipe 63, and the screw 65 has a thread corresponding to that of the screw 59.

In this embodiment, the first support base 50 is integrally screwed on the second support base 60, to make one support base. Specifically, the screw 59 of the first support base 50 is screwed on the screw 65 of the second support base 60. Finally, the aeration device has a similar appearance to that of aeration device 4 shown in FIG. 4.

Next, an aeration device 100 of the present invention is explained according to FIG. 10. FIG. 10 is a cross-section of an aeration device of FIG. 9 secured on a holder 101, wherein the aeration device doesn't include a second support base 60 and a lower half cylinder 3-5. In this embodiment, the aeration device can be installed on the holder utilizing the support base itself which is used to install the aeration device on a pipe in FIG. 6.

The aeration device of FIG. 10 is disposed on a step 102 of the holder 101, and secured on the step 102 by the combination of a bolt 105, a nut 106 and a metal fitting 107. 103 is a leg, 104 is an air inlet and 108 is an air plenum.

Operation of the aeration device 100 when submerged in an aeration basin is explained next. Air is fed from an air source through an air feed pipe (not shown) and released from an air inlet 104. The released air is spread and fills the air plenum 108, to increase the internal pressure. An elastic porous body 2 is pressed at an orifice 3-7 of a support base 3 due to an increased internal pressure, and expands and deforms upwardly beginning at a portion near to the orifice 3-7 toward a portion away from the orifice 3-7.

Due to the expansion and deformation of the elastic porous body 2, a gap is made between the elastic porous body 2 and the support base 3. Air is fed via this gap, and discharged into a water to be treated in an aeration basin as fine bubbles through expanded and enlarged small perforations in the elastic porous body 2.

In such an aeration process, since the engaging surface of each component is closely contacted and sealed, air is prevented from being discharged through portions other than perforations, and the pressure in plenum 108 is increased. So, water does not permeate through the perforations into the plenum 108. Hence, in aeration, whole volumes of fed air are discharged through the porous membrane.

So, even when actuation and stop of an aeration device is repeated, stable aeration can kept for a long term.

What is claimed is:

1. An aeration device comprising:
    an elastic porous body in the shape of a cube or a rectangular solid and comprising an opening portion, an upper planar portion in the shape of a square or a rectangle, a wall portion connected to the upper planar portion at peripheral edges thereof, a lower planar portion in the shape of a flange and connected to the wall portion at a lower edge thereof along its entire length and a protruding portion formed on an upper surface of the lower planar portion along its entire length;
    a support base for supporting the porous body and comprising an orifice for feeding pressurized air to the porous body, a supporting portion for supporting the porous body from underneath the porous body and comprising an upper planar portion, a vertical wall portion connected to the upper planar portion of the supporting portion around a peripheral edge thereof, an attaching portion connected to the supporting portion for attaching the supporting portion to a pressurized air distribution pipe and a groove portion formed in a lower surface of the vertical wall portion along its entire length, the supporting portion being disposed in a space formed by the upper planar portion, the wall portion and the lower planar portion of the porous body; and
    a securing component for securing the porous body to the support base,
    wherein the porous body covers the supporting portion, the protruding portion of the porous body engages with the groove provided in the supporting portion and the securing component is attached to the circumference of and continuously covers peripheral edges of the porous body for applying uniform pressure to the porous body.

2. An aeration system comprising two or more aeration devices of claim 1 installed on said pressurized air distribution pipe, wherein each aeration device is disposed contacting mutually with no space between.

3. The aeration device according to claim 1, wherein said attaching portion comprises an upper half cylinder portion and a lower half cylinder portion and has a shape which closely contacts with and surrounds said pressurized air distribution pipe at a position at which said aeration device is installed and said upper half cylinder portion and said lower half cylinder portion are matched.

4. The aeration device according to claim 3 which further comprises a leg portion between said attaching portion and said supporting portion, said leg portion being connected integrally with said attaching portion and said supporting portion.

5. The aeration device according to claim 4 wherein said leg portion is connected to said upper half cylinder portion by a screw.

* * * * *